United States Patent
Hachenberg (10) Patent No.: US 12,103,047 B2
(45) Date of Patent: Oct. 1, 2024

(54) CYCLONE WITH ROTATING ROD BASKET

(71) Applicant: KHD HUMBOLDT WEDAG GMBH, Cologne (DE)

(72) Inventor: Niko Hachenberg, Overath (DE)

(73) Assignee: KHD Humboldt Wedag GmbH, Cologne (DE)

( * ) Notice: Subject to any disclaimer, the term of this patent is extended or adjusted under 35 U.S.C. 154(b) by 59 days.

(21) Appl. No.: 17/637,979

(22) PCT Filed: Aug. 26, 2020

(86) PCT No.: PCT/EP2020/073789
§ 371 (c)(1),
(2) Date: Feb. 24, 2022

(87) PCT Pub. No.: WO2021/037876
PCT Pub. Date: Mar. 4, 2021

(65) Prior Publication Data
US 2022/0274137 A1 Sep. 1, 2022

(30) Foreign Application Priority Data
Aug. 28, 2019 (DE) .......................... 102019123034.9

(51) Int. Cl.
*B04C 3/06* (2006.01)
*B07B 7/083* (2006.01)
(Continued)

(52) U.S. Cl.
CPC ................ *B07B 7/083* (2013.01); *B04C 3/06* (2013.01); *B04C 2003/006* (2013.01); *B04C 2009/007* (2013.01)

(58) Field of Classification Search
CPC .. B07B 7/083; B07B 9/02; B04C 3/06; B04C 2003/006; B04C 2009/007; B04C 2003/003; B01D 45/14
See application file for complete search history.

(56) References Cited

U.S. PATENT DOCUMENTS 1,724,041 A   8/1929  Plaisted
3,234,716 A *  2/1966 Roger ....................... B04B 5/12
                                                        209/714

(Continued)

FOREIGN PATENT DOCUMENTS

DE        1507706 A1    7/1969
DE   102014015550 A1    4/2016
(Continued)

OTHER PUBLICATIONS

International Search Report; priority document.

*Primary Examiner* — Dung H Bui
(74) *Attorney, Agent, or Firm* — Greer, Burns & Crain, Ltd.

(57) ABSTRACT

A cyclone separator wherein the tapered tip of the conical hollow body faces downwards. The air separator has at least one immersion tube which abuts the conical wall of the conical hollow body and which protrudes upwards within the conical hollow body, the conical hollow body tapered tip which faces downwards being connected to an outlet for fine material. The first cylindrical hollow body is equipped with a rotating rod basket which is enclosed by a static circular conveyor trough for coarse material, the conveyor trough resting against the lower outer circumference without contacting same. The conveyor trough for coarse material is connected to an outlet out of the cylindrical hollow body, and the volume enclosed by the rod basket is fluidically connected to the conical hollow body.

7 Claims, 4 Drawing Sheets

(51) Int. Cl.
  *B04C 3/00* (2006.01)
  *B04C 9/00* (2006.01)

(56) References Cited

U.S. PATENT DOCUMENTS

| | | | | |
|---|---|---|---|---|
| 3,670,886 | A * | 6/1972 | Hosokawa | B07B 7/083 209/714 |
| 3,672,502 | A * | 6/1972 | Janich | B04C 9/00 209/718 |
| 3,791,110 | A * | 2/1974 | Klein | B01D 7/02 55/459.3 |
| 3,917,568 | A * | 11/1975 | Klein | B04C 3/06 55/342 |
| 4,863,605 | A | 9/1989 | Rienecker | |
| 5,120,431 | A * | 6/1992 | Cordonnier | B07B 7/083 209/714 |
| 5,232,096 | A * | 8/1993 | Weit | B07B 11/06 209/148 |
| 5,301,812 | A | 4/1994 | Garrett et al. | |
| 5,887,725 | A * | 3/1999 | Tominaga | B07B 7/083 209/139.1 |
| 5,938,045 | A * | 8/1999 | Makino | B07B 7/083 209/714 |
| 6,280,493 | B1 * | 8/2001 | Eubank | B01D 45/14 55/401 |
| 6,451,080 | B1 * | 9/2002 | Rocklitz | B01D 45/14 55/406 |
| 11,541,424 | B2 * | 1/2023 | Giersemehl | B02C 23/30 |
| 2003/0221996 | A1 * | 12/2003 | Svoronos | B04C 5/13 209/1 |
| 2004/0107681 | A1 * | 6/2004 | Carlsson | B04B 9/06 55/406 |
| 2005/0139701 | A1 * | 6/2005 | Naka | G03G 9/081 241/5 |
| 2005/0224426 | A1 * | 10/2005 | Arefjord | B04C 9/00 210/806 |
| 2007/0095728 | A1 * | 5/2007 | Ottow | B07B 4/02 209/714 |
| 2008/0006011 | A1 * | 1/2008 | Larnholm | B01D 19/0057 95/35 |
| 2010/0038461 | A1 * | 2/2010 | Neumann | B07B 7/086 209/714 |
| 2011/0281713 | A1 * | 11/2011 | Devroe | B07B 7/083 494/37 |
| 2012/0031270 | A1 * | 2/2012 | Carlsoon | B04B 9/06 55/409 |
| 2012/0117928 | A1 * | 5/2012 | Kondo | B01D 46/543 55/442 |
| 2015/0075377 | A1 * | 3/2015 | Gorbach | F01M 13/04 55/385.3 |
| 2016/0045923 | A1 * | 2/2016 | Correia | B01D 45/16 55/392 |
| 2017/0008034 | A1 * | 1/2017 | Raus | B07B 7/083 |
| 2017/0304869 | A1 | 10/2017 | Wilczek et al. | |
| 2017/0312760 | A1 * | 11/2017 | Eliasson | B04B 5/12 |
| 2018/0242804 | A1 * | 8/2018 | Pan | B04C 5/185 |
| 2019/0126180 | A1 * | 5/2019 | Devereux | B01D 45/08 |
| 2019/0168263 | A1 * | 6/2019 | Galk | B07B 4/025 |
| 2019/0226966 | A1 * | 7/2019 | Inkyo | B03B 5/28 |
| 2020/0122199 | A1 * | 4/2020 | Araos Almendras | F26B 5/08 |
| 2021/0102522 | A1 * | 4/2021 | Parikh | B01D 45/14 |
| 2022/0032343 | A1 * | 2/2022 | Inkyo | B07B 7/083 |
| 2022/0090820 | A1 * | 3/2022 | Gulliksen | B01D 46/0043 |
| 2023/0035878 | A1 * | 2/2023 | Peys | B03B 9/06 |

FOREIGN PATENT DOCUMENTS

| | | |
|---|---|---|
| EP | 0297386 A2 | 1/1989 |
| GB | 2505245 A | 2/2014 |
| WO | 9609120 A1 | 3/1996 |

* cited by examiner

CYCLONE WITH ROTATING ROD BASKET

CROSS-REFERENCES TO RELATED APPLICATIONS

This application claims the benefit of the International Application No. PCT/EP2020/073789, filed on Aug. 26, 2020, and of the German patent application No. 102019123034.9 filed on Aug. 28, 2019, the entire disclosures of which are incorporated herein by way of reference.

FIELD OF THE INVENTION

The invention relates to a cyclone air separator for separating granular material which is intended to be separated and which is suspended in a conveying gas, having a first, cylindrical hollow member which has a tangential to helical inlet with respect to the cylindrical form for the conveying gas which carries the material to be separated, a second, conical hollow member which is located under the first, cylindrical hollow member and which is connected directly to the first, cylindrical hollow member, wherein the tapered tip of the second, conical hollow member is directed downward, at least one immersion pipe which extends through the conical wall of the second, conical hollow member and which projects upward inside the second, conical hollow member and the opening of which is arranged in the volume of the first, cylindrical hollow member, wherein the downwardly directed, tapered tip of the second, conical hollow member is connected to an outlet for fine material.

BACKGROUND OF THE INVENTION

In order to separate granular material, it is known to suspend the granular material in an air stream and to sift or to classify it via different types of air separators. In the case of pure air separation, the carrier gas is free from granular material to the greatest possible extent. Air separators of this type are known cyclone separators in which the material which is suspended in a gas stream is forced into a vortex in a cone. In the vortex, the granular material becomes separated from the carrier gas as a result of the centrifugal force.

In classification, it is possible to subdivide the material to be separated into different granulation fractions. There is generally in a classifier a gas stream inlet, at least one outlet for the carrier gas and at least two outlets for the different particle fractions.

In a cyclone separator, a so-called immersion pipe is introduced centrally into the vortex which is brought about and, in this case, the carrier gas can flow away with ease via the immersion pipe as a result of the low density. The denser, granular material collects in the tip of the cone, however, where it falls out of an outlet. In cyclones of the generic type, the immersion pipe is introduced from above centrally into the vortex.

In the different separator types, it is always the objective to bring about the greatest possible separation effect with the smallest possible pressure loss, therefore the smallest possible compressor power. Generally, the magnitude of the pressure loss correlates with the separation power. One possibility of reducing the pressure loss may involve dimensioning the diameter of the immersion pipe to be as large as possible. If the diameter of the immersion pipe in relation to the cone of the cyclone is too great, however, the vortex continues in the immersion pipe and granular material is discharged from the cyclone separator together with the carrier gas via the immersion pipe.

SUMMARY OF THE INVENTION

An object of the invention is therefore to provide an apparatus for separating granular material which is intended to be separated and which is suspended in a conveying gas, which apparatus increases the separator efficiently with respect to existing solutions. In this case, the efficiency is measured using the ratio of the separation power in % by mass of the granular material which is separated in relation to the pressure loss over the separation apparatus. Since the pressure loss increases with increasing flow speed but the separation power also increases, such a separation apparatus generally has a characteristic line, in which the separation efficiency is indicated against the gas flow.

The object according to the invention is achieved in that a rotating rod basket which is surrounded by a static and circular conveying channel, which abuts but does not touch the lower external circumference for coarse material is arranged in the first, cylindrical hollow member, wherein the conveying channel for coarse material is connected to an outlet out of the first, cylindrical hollow member, and the volume which is surrounded by the rod basket is connected in terms of flow to the second, conical hollow member.

According to the notion of the invention, therefore, there is provision for connecting a rod basket separator to a cyclone separator. In the case of the integration of the cyclone separator and the rod basket separator, the generally overhead drive of the rod basket would collide with the immersion pipe which is introduced from above. In order to avoid this collision, there is provision in this case for directing the immersion pipe from below through the wall of the cone of the cyclone separator so that the immersion pipe leads into the cyclone in the manner of an upright discharge pipe. This type of construction allows the immersion pipe to be able to have a greater diameter than is the case with generic cyclone separators. As a result, the pressure difference decreases in the case of the given gas stream and therefore also the separator efficiency. In the integration according to the invention of a rod basket separator with a cyclone separator, there is provision for the inner volume of the rod basket separator to be directly connected to the cyclone portion which is arranged under the rod basket. The rotating rod basket brings about a cyclone which is amplified in the cone of the cyclone separator. In that the cyclone receives impetus as a result of the rod basket, it is possible to provide the immersion pipe with a greater diameter. A circular conveying channel is arranged under the rod basket, as in a rod basket separator, in which coarse material which could not take the path through the rods of the rotating rod basket falls, in the separator according to the inventive notion. This fraction can be removed as a coarse fraction from the integrated separator, in which the coarse material trickles out via an outlet. In the inner volume of the rod basket, the carrier gas rotates approximately at the speed of the rod basket. Typical speeds of rod baskets are 60 m/s circumferential speed. With a rod basket diameter of from 1 m to 2 m, this corresponds to approximately from 600 to 1200 p rpm. At this rotation speed, the conveying gas flows into the cyclone portion of the integrated separator and has obtained at that location a pre-acceleration which can otherwise be achieved only as a result of a high flow speed as a result of a narrow supply pipe which blows tangentially into the upper portion of the cyclone. The vortex which is pre-accelerated by the rod basket produces a gas stream which is substantially free from particles within the vortex. This particle-free portion of the vortex can be directed away by an immersion pipe which leads in an upward direction. In the peripheral turbulent stream, the fine fraction of the granular material which leaves the cyclone portion of the integrated separator via the cone becomes enriched.

In an advantageous and optimized embodiment of the invention, there is provision for the first, cylindrical hollow member to extend as far as a location under the rod basket and to have under the rod basket a height which corresponds to between 50% and 150% of the height of the second, conical hollow member. The height ratio of the conical portion and cylindrical portion of the integrated separator acts on the efficiency of the separation power. If the cylindrical portion is too high, the vortex in the cyclone can taper in the manner of a tornado to form a hose-like vortex and can consequently allow the carrier gas and the fine fraction to flow through the immersion pipe. If the cylindrical portion is too flat, it may be the case that the pre-accelerated vortex is forced into the immersion pipe and as a result the separator efficiency decreases. The object of the optimized embodiment is to expand the pre-accelerated vortex so that an immersion pipe with a diameter which is as large as possible can extend inside the central vortex. For further optimization, the diameter ratio of the immersion pipe and cone width has been found to be an important optimization parameter. In a particularly optimized embodiment, there is provision for the diameter of the immersion pipe to correspond to between 20% and 60%, preferably between 30% and 50% of the internal diameter of the first, cylindrical hollow member.

In another embodiment of the separation apparatus according to the invention, there may be provision for a substantially conical member, whose tapered tip is directed upward, to be arranged above the opening of the immersion pipe, wherein helically formed guiding plates whose winding direction corresponds to the rotation direction of the rod basket are provided on the external surface of the substantially conical member. The conical member substantially acts as a round pointed roof which is arranged in the manner of a tower roof above the tip of a tower. There is located between the tower tip and the roof ridge a generous annular gap, through which the conveying gas can flow into the immersion pipe. The substantially conical member with the helical guiding plates supports the expansion of the vortex which is brought about by the rod basket, whereby the separation power of the integrated separator is increased. In order to optimize the application of the substantially conical member to the vortex which is brought about by the rod basket in terms of its action, in an advantageous embodiment of the invention there may be provision for the substantially conical member to be retained, for example, by spokes inside the first cylindrical member, wherein the spokes are connected to the wall of the first, cylindrical hollow member and wherein the vertical position of the substantially conical member is adjustable above the immersion pipe, in which the position of the spokes in the wall (Wz) of the first, cylindrical hollow member is vertically adjustable by elongate holes. As a result of the vertical variation, the location of the substantially conical member can be optimized in accordance with the flow speed of the carrier gas once selected so that a maximum expansion of the vortex is produced.

The substantially conical member can be arranged statically or can instead rotate with the rod basket. The rotating member which is provided with guiding plates in the vortex assists the vortex which is brought about by the rod basket to even greater rotational energy, whereby the rotation speed of the vortex is not reduced too powerfully during expansion.

Instead of the substantially conical member in the vortex, the vortex can also be expanded with a static, inverse impeller. A static inverse impeller comprises guiding plates annularly arranged in the form of a helical member.

There is no guiding plate at the center of the inverse impeller. The external vortex flow which is brought about by the external guiding plates assists the central vortex to expand.

In order to adjust the ideal vertical position of the static inverse impeller, there may be provision for the substantially annular member to be connected to the wall of the cylindrical member, wherein the vertical position of the substantially annular member above the immersion pipe can be adjusted by means of bolts which extend through elongate holes in the wall of the cylindrical member.

BRIEF DESCRIPTION OF THE DRAWINGS

The invention is explained in greater detail with reference to the following
Figures. In the drawings.

DETAILED DESCRIPTION OF THE PREFERRED EMBODIMENTS

Figure 1:
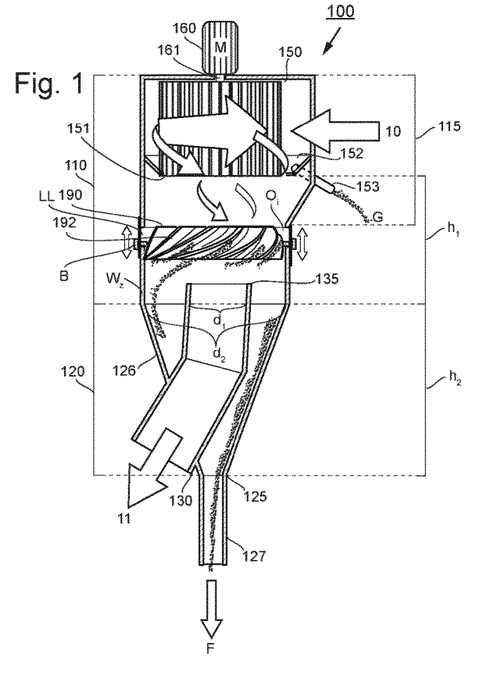
FIG. 1 shows a first variant of a cyclone according to the invention with a rotating rod basket.

FIG. 1 schematically shows a broken-away side view of a first variant of a cyclone 100 according to the invention with a rotating rod basket 150. This cyclone air separator 100 for separating granular material which is intended to be separated and which is suspended in a conveying gas 10 has the following part-elements: initially, a first, cylindrical hollow member 110 with a tangential to helical inlet 115 with respect to the cylindrical form for the conveying gas 10 which carries the material to be separated. The conveying gas 10 flows into this tangential to helical inlet 115 and, at that location, strikes a rod basket 150 in a tangential direction/helical direction. The rod basket 150 is rotated by a drive 160 via a drive shaft 161. A second, conical hollow member 120 which is directly connected to the first, cylindrical hollow member 110 is located under the first, cylindrical hollow member 110, wherein the tapered tip 125 of the second, conical hollow member 120 is directed downward. An immersion pipe 130 which projects upward inside the second, conical hollow member 120 and the opening 135 of which is arranged in the volume of the first, cylindrical hollow member 110 extends through the conical wall 126 of the second, conical hollow member 120. The downwardly directed, tapered tip 125 of the second, conical hollow member 120 is connected to an outlet 127 for fine material F. The rotating rod basket 150 which is arranged in the first, cylindrical hollow member 110 is surrounded by a static and circular conveying channel 152, which abuts but does not touch the lower external circumference 151, for coarse material G, wherein the conveying channel 152 for coarse material G is connected to an outlet 153 from the first, cylindrical hollow member 110. The volume which is surrounded by the rod basket 150 is connected in terms of flow to the second, conical hollow member 120. During operation, the conveying gas 10 flows into the lateral, tangential or helical inlet 115 and, at that location, strikes the rotating rod basket 150 in a manner pre-accelerated by the flow speed in a tangential or helical manner In this case, the rotation direction of the rotating rod basket is selected so that the tangential to helical flow corresponds to the rotation direction. During the flow around the rotating rod basket 150, conveying gas and fine material F flow through the individual rods of the rotating rod basket 150 and thus reach the internal volume which is surrounded by the rod basket 150. However, coarse material G is thrown outwardly by the centrifugal force and, where applicable, thrown back by the rods of the rod basket 150. As a result of gravitational force, the coarse material G falls into the conveying channel 152 for coarse material G and rolls or trickles there to the outlet 153, whereby the coarse material leaves the cyclone with a rotating rod basket 150. The carrier gas 10 with fine material F located in the volume surrounded by the rod basket 150 flows with a moment of momentum provided by the rotating rod basket 150 downward into the lower portion of the first, cylindrical hollow member 110.

At that location, in the lower portion of the first, cylindrical hollow member 110, in this first variant of the cyclone with a rotating rod basket 150 the carrier gas 10 flows with fine material F suspended therein past guiding plates 192 which are arranged in the manner of vanes of an inverse impeller. These guiding plates 192 are arranged above the opening 135 of the immersion pipe 130 along a substantially annular member 190, on the internal surface Oi of a substantially annular member 190. At that location, the helically formed guiding plates 192 whose winding direction corresponds to the rotation direction of the rod basket 150 are provided. In this variant, the helical guiding plates 192 project from the wall of the first, cylindrical hollow member 110 inwardly, but leave an opening free at the center of the first, cylindrical hollow member 110 so that the guiding plates 192 are arranged in the manner of impeller vanes of an impeller without any central spinner. These guiding plates 192 which are external for the vortex comprising carrier gas 10 and fine material F allow the vortex to expand and to merge, with pre-acceleration, into the second, conical hollow member 120 of the cyclone, where the expanded vortex is tapered by the cone again and the fine material F is thrown out of the vortex by the acceleration during the tapering of the vortex. The carrier gas 10 which is free from fine material F subsequently flows into the upper opening 135 of the immersion pipe 130, whereas the fine material F collects on the lower tapered tip 125 of the second, conical hollow member 120 and, at that location, is discharged from the outlet 127 as a result of gravitational force.

For an optimized form of the cyclone with a rotating rod basket 150, it has been found that such a form, in which the first, cylindrical hollow member 110 extends as far as a location under the rod basket 150 and under the rod basket 150 has a height h1 which corresponds to between 50% and 150% of the height h2 of the second, conical hollow member 120, works well. At this height ratio, it is possible for the diameter d1 of the immersion pipe 130 to have between 20% and 60%, preferably between 30% and 50% of the internal diameter d2 of the first, cylindrical hollow member 110. This very large diameter for an immersion pipe allows operation of the cyclone with a rotating rod basket 150 which produces a comparatively small pressure loss.

Figure 2:
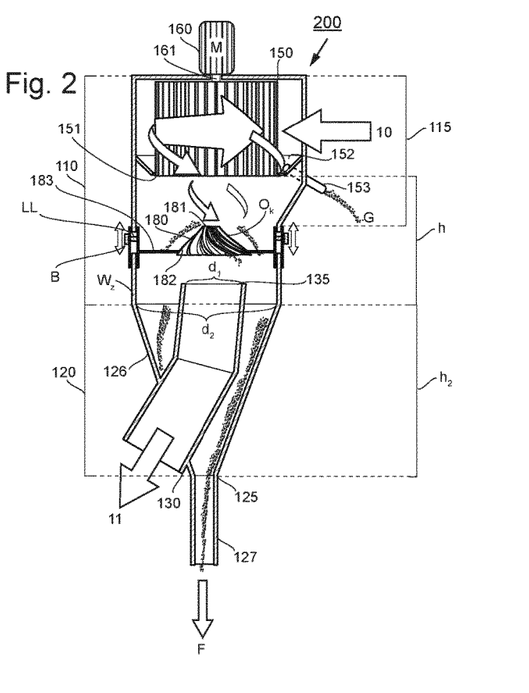
FIG. 2 shows a second variant of a cyclone according to the invention with a rotating rod basket.

FIG. 2 schematically shows a second variant of a cyclone 200 according to the invention with a rotating rod basket 150 as a broken-away side view. This cyclone air separator 200 for separating granular material which is intended to be separated and which is suspended in a conveying gas 10 has the following part-elements: initially, a first, cylindrical hollow member 110 having a tangential to helical inlet 115 with respect to the cylindrical shape for the conveying gas 10 which carries the material to be separated. The conveying gas 10 flows into this tangential to helical inlet 115 and, at that location, strikes a rod basket 150 in a tangential direction/helical direction. The rod basket 150 is rotated by a drive 160 via a drive shaft 161. Under the first, cylindrical hollow member 110 there is located a second, conical hollow member 120 which is directly connected to the first, cylindrical hollow member 110, wherein the tapered tip 125 of the second, conical hollow member 120 is directed downward. An immersion pipe 130 which projects upward inside the second, conical hollow member 120 and the opening 135 of which is arranged in the volume of the first, cylindrical hollow member 110 extends through the conical wall 126 of the second, conical hollow member 120. The downwardly directed, tapered tip 125 of the second, conical hollow member 120 is connected to an outlet 127 for fine material F. The rotating rod basket 150 which is arranged in the first, cylindrical hollow member 110 is surrounded by a static and circular conveying channel 152 which abuts but does not touch the lower external circumference 151 for coarse material G, wherein the conveying channel 152 for coarse material G is connected to an outlet 153 from the first, cylindrical hollow member 110. The volume which is surrounded by the rod basket 150 is connected to the second, conical hollow member 120 in terms of flow. During operation, the conveying gas 10 flows into the lateral, tangential or helical inlet 115 and, at that location, strikes the rotating rod basket 150 tangentially or helically in a manner pre-accelerated by the flow speed. In this case, the rotation direction of the rotating rod basket is selected so that the tangential to helical flow corresponds to the rotation direction. During the flow around the rotating rod basket 150, conveying gas and fine material F flow through the individual rods of the rotating rod basket 150 and thus reach the internal volume surrounded by the rod basket 150. However, the coarse material G is thrown outward by the centrifugal force and, where applicable, is thrown back by the rods of the rod basket 150. As a result of gravitational force, the coarse material G falls into the conveying channel 152 for coarse material G and rolls or trickles at that location to the outlet 153, whereby the coarse material leaves the cyclone with the rotating rod basket 150. The carrier gas 10 which is located in the volume which is surrounded by the rod basket 150 with fine material F flows with a moment of momentum which is provided by the rotating rod basket 150 downward into the lower portion of the first, cylindrical hollow member 110.

At that location, in the lower portion of the first, cylindrical hollow member 110, in this first variant of the cyclone with a rotating rod basket 150 the carrier gas 10 flows with fine material F suspended therein past a substantially conical member 180 and is expanded thereby. In this case, the substantially conical member 180 is arranged above the opening 135 of the immersion pipe 130, wherein the tapered tip 181 thereof is directed upwardly and wherein helically formed guiding plates 182, the winding direction of which corresponds to the rotation direction of the rod basket 150, are provided on the outer surface Ok of the substantially conical member 180. In the manner of a round pointed roof of a tower, the substantially conical member 180 extends into the vortex which is flowing downward out of the rod basket 150 and expands it, wherein the guiding plates 182 support the expansion of the vortex while maintaining a turbulent flow. In order to find the optimum expansion point, there is provision in this embodiment for the substantially conical member 180 to be retained by spokes 183 inside the first, cylindrical member 110. These spokes 183 are connected to the wall Wz of the first, cylindrical hollow member 110, wherein the vertical position of the substantially conical member 180 above the immersion pipe 130 is adjustable by the position of the spokes 183 in the wall Wz of the first, cylindrical hollow member 110 being vertically adjustable by means of elongate holes LL.

The fine material which flows through the expanded vortex into the second, lower conical hollow member 120 collects in the cone of the cyclone and falls out of the cyclone at the lower, tapered tip at the outlet 127. However, the carrier gas which is free of the fine material flows through the opening 135 in the immersion pipe 130 out of the cyclone.

Figure 3:
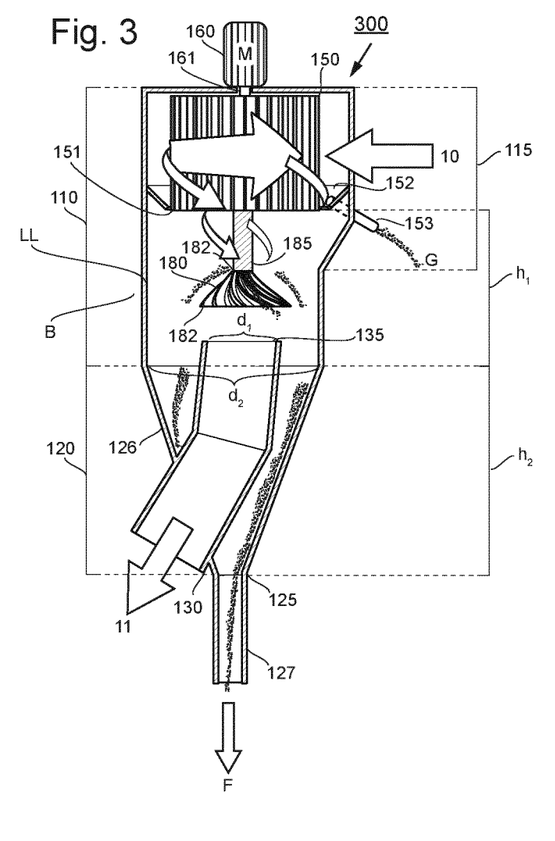
FIG. 3 shows a third variant of a cyclone according to the invention with a rotating rod basket.

FIG. 3 schematically shows a third variant of a cyclone 300 according to the invention with a rotating rod basket 150 as a broken-away side view. This cyclone air separator 300 for separating granular material which is intended to be separated and which is suspended in a conveying gas 10 has the following part-elements: initially, a first, cylindrical hollow member 110 having a tangential to helical inlet 115 with respect to the cylindrical shape for the conveying gas 10 which carries the material to be separated. The conveying gas 10 flows into this tangential to helical inlet 115 and, at that location, strikes a rod basket 150 in a tangential direction/helical direction. The rod basket 150 is rotated by a drive 160 via a drive shaft 161. Under the first, cylindrical hollow member 110 there is located a second, conical hollow member 120 which is directly connected to the first, cylindrical hollow member 110, wherein the tapered tip 125 of the second, conical hollow member 120 is directed downward. An immersion pipe 130 which projects upward inside the second, conical hollow member 120 and the opening 135 of which is arranged in the volume of the first, cylindrical hollow member 110 extends through the conical wall 126 of the second, conical hollow member 120. The downwardly directed, tapered tip 125 of the second, conical hollow member 120 is connected to an outlet 127 for fine material F. The rotating rod basket 150 which is arranged in the first, cylindrical hollow member 110 is surrounded by a static and circular conveying channel 152 which abuts but does not touch the lower external circumference 151 for coarse material G, wherein the conveying channel 152 for coarse material G is connected to an outlet 153 from the first, cylindrical hollow member 110. The volume which is surrounded by the rod basket 150 is connected to the second, conical hollow member 120 in terms of flow. During operation, the conveying gas 10 flows into the lateral, tangential or helical inlet 115 and, at that location, strikes the rotating rod basket 150 tangentially or helically in a manner pre-accelerated by the flow speed. In this case, the rotation direction of the rotating rod basket is selected so that the tangential to helical flow corresponds to the rotation direction. During the flow around the rotating rod basket 150, conveying gas and fine material F flow through the individual rods of the rotating rod basket 150 and thus reach the internal volume surrounded by the rod basket 150. However, the coarse material G is thrown outward by the centrifugal force and, where applicable, is thrown back by the rods of the rod basket 150. As a result of gravitational force, the coarse material G falls into the conveying channel 152 for coarse material G and rolls or trickles at that location to the outlet 153, whereby the coarse material leaves the cyclone with the rotating rod basket 150. The carrier gas 10 which is located in the volume which is surrounded by the rod basket 150 with fine material F flows with a moment of momentum which is provided by the rotating rod basket 150 downward into the lower portion of the first, cylindrical hollow member 110.

At that location, in the lower portion of the first, cylindrical hollow member 110, in this first variant of the cyclone with a rotating rod basket 150 the carrier gas 10 flows with fine material F suspended therein past a substantially conical member 180 and is expanded thereby. In this case, the substantially conical member 180 is arranged above the opening 135 of the immersion pipe 130, wherein the tapered tip 181 thereof is directed upwardly and wherein helically formed guiding plates 182, the winding direction of which corresponds to the rotation direction of the rod basket 150, are provided on the outer surface Ok of the substantially conical member 180. A particular feature of this variant is that the substantially conical member 180 is connected to the rod basket 150 via a shaft 185 and also rotates with the rod basket 150. As a result of the joint rotation, the substantially conical member 180 further imparts a rotation impulse to the vortex which flows out of the rod basket 150 during the expansion so that the rotation pulse of the vortex is not braked too powerfully during the expansion.

In this variant, it is also the case that the substantially conical member 180 which also rotates with the rod basket 150 extends into the vortex which is flowing downward out of the rod basket 150 and expands it in the manner of a round pointed roof of a tower, wherein the guiding plates 182 support the expansion of the vortex while maintaining a turbulent flow. The fine material which flows into the second, lower conical hollow member 120 as a result of the expanded vortex collects in the cone of the cyclone and falls out of the cyclone at the lower, tapered tip at the outlet 127. However, the carrier gas which is free from the fine material flows through the opening 135 in the immersion pipe 130 out of the cyclone.

Figure 4:
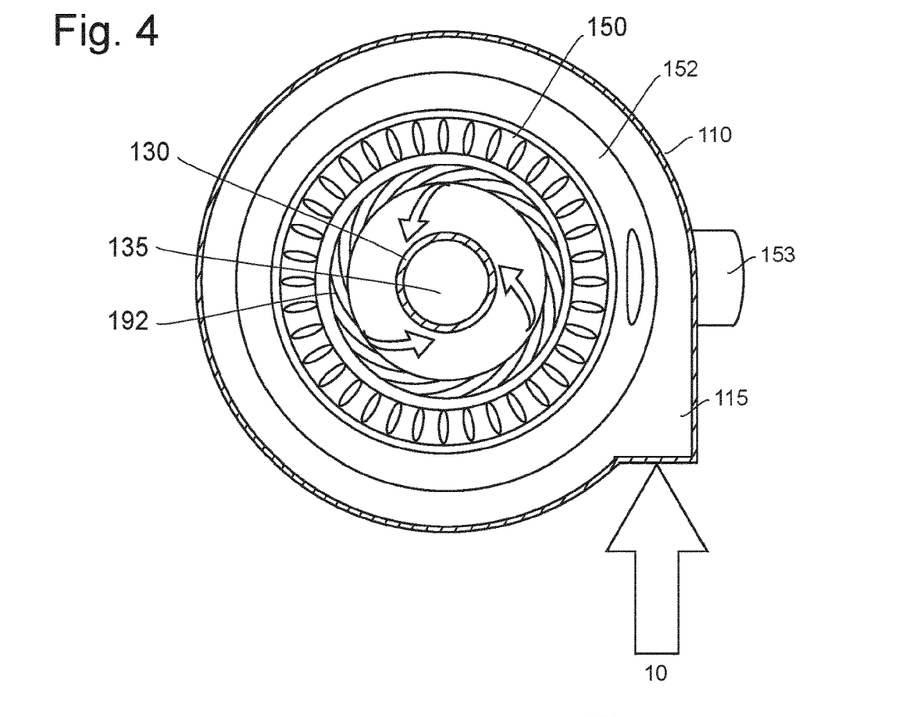
FIG. 4 is a broken-away view from above of the first variant according to FIG. 1.

FIG. 4 is a schematic plan view into the cyclone, which is broken away at the top, according to FIG. 1 with a rod basket 150. The conveying gas 10 with fine material F suspended therein is introduced into the tangential to helical inlet 115 in the first, cylindrical hollow member 110. At that location, it initially moves around the rotating rod basket 150, wherein the rotation direction of the rod basket 150 and the inwardly flowing carrier gas 10 correspond to each other. After the rotating rod basket 150 has been passed, the carrier gas flows into the internal volume which is surrounded by the rod basket 150 and, at that location, strikes the guiding plates 192 which are constructed in the manner of an inverse impeller, that is to say, in the manner of guiding plates as impeller wings which project in an inward direction and which leave a free passage at the center. In FIG. 1, there are depicted arrows which are intended to represent the vortex and which flow downward out of the rod basket 150, in this instance approximately into the center of the drawing. There is shown at the center of the drawing the opening 135 of the immersion pipe through which the carrier gas 10 which is free from fine material F flows.

Figure 5:
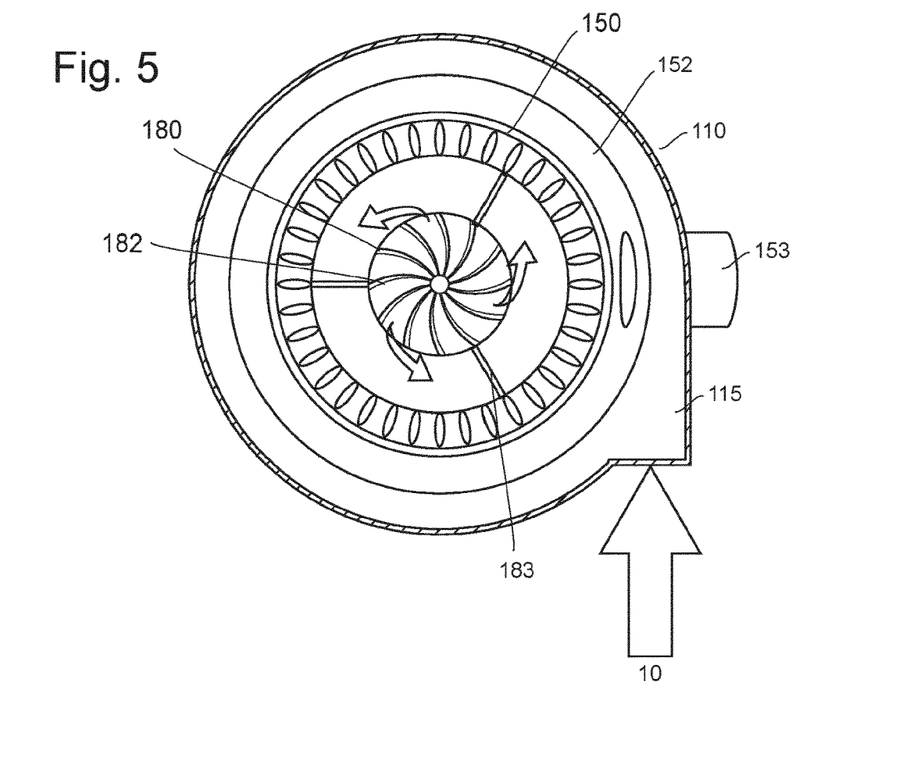
FIG. 5 is a broken-away view from above of the first variant according to FIG. 2.

FIG. 5 is a schematic plan view into the cyclone, which is broken away at the top, according to FIG. 2 with a rod basket 150. The conveying gas 10 with fine material F suspended therein is introduced into the tangential to helical inlet 115 in the first, cylindrical hollow member 110. At that location, it initially moves around the rotating rod basket 150, wherein the rotation direction of the rod basket 150 and the inwardly flowing carrier gas 10 correspond to each other. After the rotating rod basket 150 has been passed, the carrier gas flows into the internal volume which is surrounded by the rod basket 150 and, at that location, strikes the guiding plates 182 of a substantially conical member which extends into the downwardly flowing vortex (here, at the center of the drawing) and expands the vortex with the guiding plates 182 which are located on the roof surface of the substantially conical member 180. In this case, the substantially conical member 180 acts in the manner of a roof surface by means of the opening 135 (covered in this case) of the immersion pipe 130.

Figure 6:
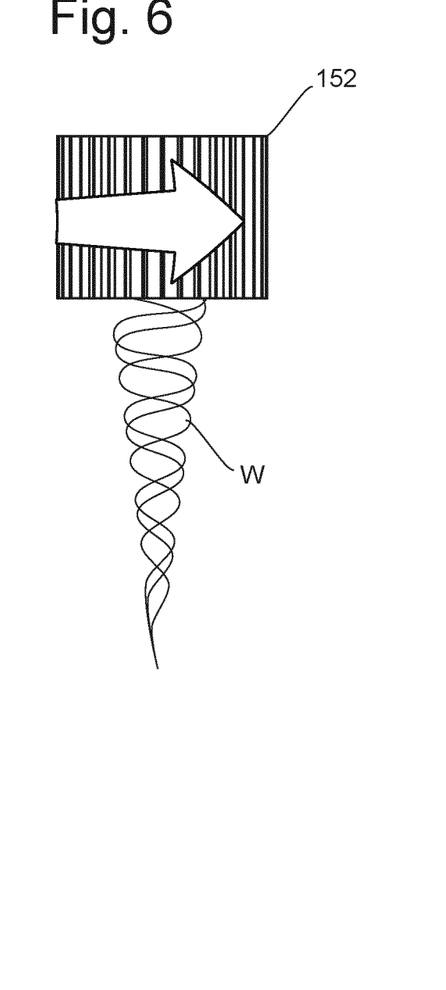
FIG. 6 shows a rotating rod basket with a vortex, wherein the vortex is not expanded by guiding plates.

FIG. 6 illustrates a rotating rod basket 150 with a vortex W which flows downward out of the rod basket 150, wherein the vortex W is not expanded by guiding plates or other measures which control the flow. Without a guiding plate arrangement, the vortex W would flow downward in the manner of a tornado and would taper in this case, and flow directly out of the rod basket into the opening of an immersion pipe which is located under the rod basket 150 and which is not shown here.

Figure 7:
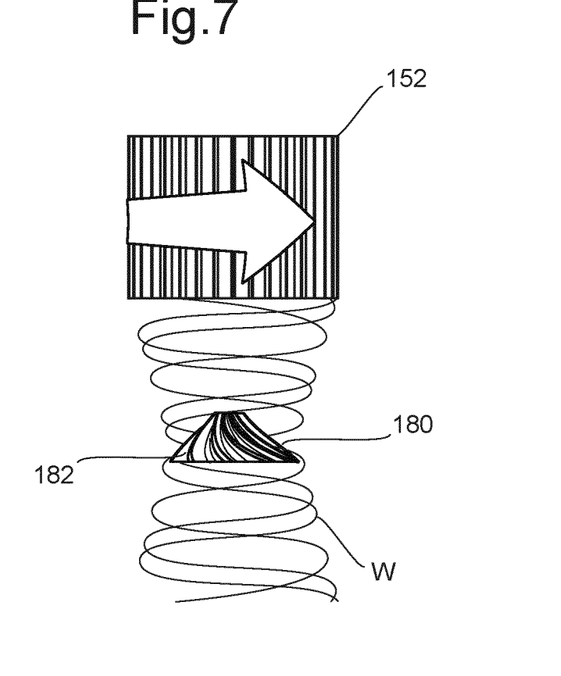
FIG. 7 shows a rotating rod basket with a vortex, wherein the vortex is expanded by guiding plates according to the second and third variants from FIG. 2 and FIG. 3.
Figure 8:
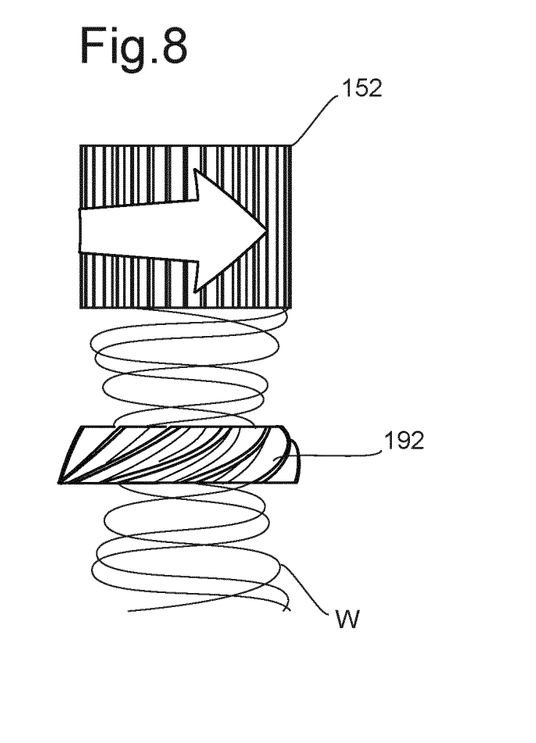
FIG. 8 shows a rotating rod basket with a vortex, wherein the vortex is expanded by guiding plates according to the first variant of FIG. 1.

FIG. 7 illustrates a rotating rod basket 150 with a vortex W which flows downward out of the rod basket 150, wherein the vortex W is expanded in this illustration by guiding plates 182 of a substantially conical member 180 according to the variants in FIG. 2 and FIG. 3. The expanded vortex W leaves free space for an immersion pipe which is not shown here with a relatively great diameter without the vortex W flowing directly into an immersion pipe which is located under the rod basket 150.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

10 Conveying gas
111 Exhaust air
100 Air separator
110 Cylindrical hollow member
115 Inlet
120 Conical hollow member
125 Tapered tip
126 Conical wall
127 Outlet
130 Immersion pipe
135 Opening
150 Rod basket
151 Lower external circumference
152 Conveying channel
153 Outlet
160 Drive
161 Drive shaft
180 Substantially conical member
181 Tapered tip
182 Guiding plate
183 Spoke
185 Shaft
190 Substantially annular member
192 Guiding plate
200 Air separator
300 Air separator
B Bolt
$d_1$ Diameter
$d_2$ Diameter
F Fine material
G Coarse material
$h_1$ Height
$h_2$ Height
LL Elongate hole
$O_k$ Outer surface
$O_i$ Inner surface
$O_z$ Surface
W Vortex
$W_z$ Wall

The invention claimed is:

1. A cyclone air separator for separating granular material which is intended to be separated and which is suspended in a conveying gas, comprising
a first, cylindrical hollow member with a cylindrical form and which has a tangential to helical inlet with respect to the cylindrical form for the conveying gas which carries the material to be separated,
a second, conical hollow member which is located under the first, cylindrical hollow member and which is connected directly to the first, cylindrical hollow member, wherein a tapered tip of the second, conical hollow member is directed downward,
at least one immersion pipe which extends through a conical wall of the second, conical hollow member and which projects upward inside the second, conical hollow member and an opening of which is arranged in a volume of the first, cylindrical hollow member,
wherein, the downwardly directed, tapered tip of the second, conical hollow member is connected to an outlet for fine material,
wherein a rotating rod basket which
is surrounded by a static and circular conveying channel which abuts but does not touch a lower external circumference for coarse material is arranged in the first, cylindrical hollow member, wherein the conveying channel for coarse material is connected to an outlet out of the first, cylindrical hollow member, and
the volume which is surrounded by the rod basket is connected in terms of flow to the second, conical hollow member,
wherein a conical member, whose tapered tip is directed upward, is arranged above the opening of the immersion pipe, wherein helically formed guiding plates whose winding direction corresponds to a rotation direction of the rod basket are provided on an external surface of the substantially conical member, and, wherein the conical member is connected to the rod basket via a shaft and also rotates with the rod basket.

2. The cyclone air separator as claimed in claim 1, wherein the first, cylindrical hollow member extends as far as a location under the rod basket and has under the rod basket a height which corresponds to between 50% and 150% of the height of the second, conical hollow member.

3. The cyclone air separator as claimed in claim 1, wherein a diameter of the immersion pipe corresponds to between 20% and 60% of an internal diameter of the first, cylindrical hollow member.

4. The cyclone air separator as claimed in claim 1, wherein the rod basket has a drive, a drive shaft of which projects from above into the first, cylindrical hollow member.

5. The cyclone air separator as claimed in claim 1, wherein the conical member is retained by spokes inside the first, cylindrical hollow member, wherein the spokes are connected to a wall of the first, cylindrical hollow member, and wherein a vertical position of the conical member is adjustable above the immersion pipe, in which a position of the spokes in the wall of the first, cylindrical hollow member is vertically adjustable by elongate holes.

6. The cyclone air separator as claimed in claim 1, wherein an annular member is arranged above the opening of the immersion pipe, wherein helically formed guiding plates whose winding direction corresponds to a rotation direction of the rod basket are provided on an internal surface of the annular member.

7. The cyclone air separator as claimed in claim 6, wherein the annular member is connected to a wall of the cylindrical member, wherein the vertical position of the annular member above the immersion pipe can be adjusted by means of bolts which extend through elongate holes in the wall of the cylindrical member.

\* \* \* \* \*